United States Patent
Chhaya et al.

(10) Patent No.: US 10,796,095 B2
(45) Date of Patent: Oct. 6, 2020

(54) PREDICTION OF TONE OF INTERPERSONAL TEXT COMMUNICATIONS

(71) Applicant: Adobe Inc., San Jose, CA (US)

(72) Inventors: Niyati Himanshu Chhaya, Hyderabad (IN); Tanya Goyal, Austin, TX (US); Projjal Chanda, Silchar (IN); Kushal Chawla, Bengaluru (IN); Jaya Singh, Jaipur (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/945,996

(22) Filed: Apr. 5, 2018

(65) Prior Publication Data
US 2019/0311035 A1 Oct. 10, 2019

(51) Int. Cl.
G06F 40/30 (2020.01)
G06N 5/04 (2006.01)
G06N 20/00 (2019.01)
G06F 40/211 (2020.01)
G06F 40/284 (2020.01)

(52) U.S. Cl.
CPC ............ *G06F 40/30* (2020.01); *G06F 40/211* (2020.01); *G06F 40/284* (2020.01); *G06N 5/04* (2013.01); *G06N 20/00* (2019.01)

(58) Field of Classification Search
CPC .. G06F 17/2785; G06F 17/271; G06F 17/277; G06F 40/30; G06F 40/284; G06F 40/211; G06N 20/00; G06N 5/04
See application file for complete search history.

(56) References Cited

U.S. PATENT DOCUMENTS

| 10,037,768 | B1 | 7/2018 | Akkiraju et al. | |
|---|---|---|---|---|
| 2017/0060982 | A1 | 3/2017 | Akkiraju et al. | |
| 2017/0061448 | A1 | 3/2017 | Akkiraju et al. | |
| 2017/0061497 | A1 | 3/2017 | Akkiraju et al. | |
| 2018/0032870 | A1* | 2/2018 | Liu | G06Q 40/06 |
| 2018/0203847 | A1 | 7/2018 | Akkiraju et al. | |
| 2018/0268734 | A1 | 9/2018 | Akkiraju et al. | |

(Continued)

OTHER PUBLICATIONS

Zemel, "Combining Models," Lecture slides for CSC2515 Introduction to Machine Learning, University of Toronto, Winter 2015 (available at https://www.cs.toronto.edu/~urtasun/courses/CSC2515/08ensemble-2515.pdf, last accessed Nov. 1, 2019) (Year: 2015).*

(Continued)

*Primary Examiner* — Michelle M Koeth
(74) *Attorney, Agent, or Firm* — Finch & Maloney PLLC

(57) ABSTRACT

Techniques are disclosed for predicting a tone of a text communication using psycholinguistic features of the text communication. In some examples, a method may include generating a feature vector for a text communication using features, including psycholinguistic features, extracted from the text communication, and predicting a tone of the text communication based on the feature vector. The tone is predicted by a trained prediction module that is trained using psycholinguistic features of text communications in a training set used to train the trained prediction module. The predicted tone is at least one of a predicted measure of frustration, a predicted measure of formality, and a predicted measure of politeness.

20 Claims, 11 Drawing Sheets

```
Algorithm 1 Extracting ANEW features
 1: procedure ANEW-FEATURES(text, lexicons)
 2:    words = nltk.word_tokenize(text)
 3:    dimensions = ["valence","arousal","dominance"]
 4:    affect = [0,0,0]
 5:    count = 0
 6:    numAffects = len(affect)
 7:    for word in words do
 8:       if word.isalpha() then
 9:          if word in lexicons.keys() then
10:             emolist = lexicons[word]
11:             affect[0] += emolist[0]
12:             affect[1] += emolist[1]
13:             affect[2] += emolist[2]
14:             count += 1
15:    if count != 0 then
16:       affect = [i/count for i in affect]
17:    features = {}
18:    index = 0
19:    while index < numAffects do
20:       features[dimensions[index]] = affect[index]
21:       index += 1
22:    return features
```

(56) References Cited

U.S. PATENT DOCUMENTS

| | | | |
|---|---|---|---|
| 2018/0268736 A1* | 9/2018 | Akkiraju | G06N 20/00 |
| 2018/0293241 A1* | 10/2018 | Chittar | G06N 20/00 |
| 2018/0307672 A1 | 10/2018 | Akkiraju et al. | |
| 2018/0307673 A1 | 10/2018 | Akkiraju et al. | |
| 2018/0307674 A1 | 10/2018 | Akkiraju et al. | |
| 2018/0307675 A1 | 10/2018 | Akkiraju et al. | |
| 2019/0034830 A1* | 1/2019 | Burangulov | G06N 5/04 |
| 2019/0087414 A1* | 3/2019 | Narayanan | G06F 17/18 |
| 2019/0147366 A1* | 5/2019 | Sankaran | G06N 3/04 706/12 |
| 2019/0163807 A1* | 5/2019 | Jain | G10L 15/265 |
| 2019/0266471 A1 | 8/2019 | Rakshit | |

OTHER PUBLICATIONS

Warriner et. al, "Norms of valence, arousal, and dominance for 13,915 English lemmas," Behavior Research Methods, vol. 45, 35 pages, Dec. 2013. (Year: 2013).*
Clos et al., "Predicting Emotional Reaction in Social Networks," 39th European Colloquium on Information Retrieval (ECIR 2017), Apr. 2017, Aberdeen, United Kingdom. pp. 527-533 (Year: 2017).*
Kern et al., "A multidimentional approach to measuring well-being in students: Application of the PERMA framework," The Journal of Positive Psychology, vol. 10, No. 3, pp. 262-271, 2015 (Year: 2015).*
Santos et al., "PLN-PUCRS at Emolnt-2017: Psycholinguistic features for emotion intensity prediction in tweets," Proceedings of the 8th Workshop on Computational Approaches to Subjectivity, Sentiment and Social Media Analysis, pp. 189-192, Copenhagen, Denmark, Sep. 7-11, 2017 (Year: 2017).*
Danescu-Niculescu-Mizil et al., "A computational approach to politeness with application to social factors," Association for Computational Linguistics, Aug. 2013, pp. 250-259 (Year: 2013).*
Sheikha et al., "Automatic classification of documents by formality," Proceedings of the 6th International Conference on Natural Language Processing and Knowledge Engineering(NLPKE-2010), Beijing, 2010, pp. 1-5 (Year: 2010).*
Nesreen K Ahmed and Ryan A Rossi, "Interactive Visual Graph Analytics on the Web.", 2015, Proceedings of the Ninth International AAAI Conference on Web and Social Media, Association for the Advancement of Artificial Intelligence, pp. 566-569.
I. Elaine Allen et al., "Likert scales and data analyses", Jul. 2007, Quality Progress, ASQ, vol. 40, No. 7, 3 pages.
Julian Brooke et al., "Automatic acquisition of lexical formality", 2010, Proceedings of the 23rd International Conference on Computational Linguistics: Posters. Association for Computational Linguistics, pp. 90-98.
Judee K. Burgoon and Jerold L. Hale, "The fundamental topoi of relational communication", Sep. 1984, Communication Monographs, vol. 51, No. 3, pp. 193-214.
James A. Russell and Albert Mehrabian, "Evidence for a three-factor theory of emotions", 1977, Journal of research in Personality, vol. 11, pp. 273-291.
Rafael A. Calvo et al., "Affect detection: An interdisciplinary review of models, methods, and their applications", IEEE Transactions on Affective Computing, vol. 1, No. 1, Jan.-Jun. 2010, pp. 18-37.
Anurat Chapanond et al., "Graph Theoretic and Spectral Analysis of Enron Email Data", 2005, Computational & Mathematical Organization Theory, vol. 11, Department of Computer Science Rensselaer Polytechnic Institute, Troy, NY, 8 pages.
Saif Mohammad and Peter D Turney, "Crowdsourcing a Word-Emotion Association Lexicon", arXiv:1308.6297v1; Aug. 28, 2013, 25 pages.
Leon Ciechanowski et al., "The Necessity of New Paradigms in Measuring Human-Chatbot Interaction", Jul. 2018, Advances in Intelligent Systems and Computing, Springer International Publishing, AG, 11 pages.

William W. Cohen, "Enron email dataset", 2009, Retrieved from the Internet: URL: https://www.cs.cmu.edu/~enron, [copy retrieved from on Apr. 20, 2018] 2 pages.
Cristina Conati and Heather Maclaren, "Empirically Building and Evaluating a Probabilistic Model of User Affect", Jan. 30, 2009, User Modeling and User-Adapted Interaction, vol. 19, Springer Science + Business Media B.V, pp. 267-303.
Rachel Cotterill, "Using Stylistic Features for Social Power Modeling", 2013, Computación Sistemas, vol. 17, No. 2, pp. 219-227.
Cristian Danescu-Niculescu-Mizil et al., "A computational approach to politeness with application to social factors", 2013, Stanford University, Max Planck Institute SWS, 10 pages.
Sufal Das and Hemanta K Kalita, "Sentiment Analysis for Web-based Big Data: A Survey", May-Jun. 2017, International Journal of Advanced Research in Computer Science, vol. 8, No. 5, pp. 1996-1999.
Jana Diesner et al., "Communication networks from the Enron Email Corpus: 'It's Always About the People. Enron is no Different'", 2006, Computational & Mathematical Organization Theory, vol. 11, No. 3, pp. 201-228.
Sidney K. D'Mello et al., "Automatic Detection of Learner's Affect from Conversational Cues", Feb. 1, 2008, User Modeling and User-Adapted Interaction, vol. 18, 26 pages.
Paul Ekman, "An argument for Basic Emotions", 1992, Cognition & Emotion 6, 3-4, Lawrence Erlbaum Associates Limited, pp. 169-200.
Sanaz Jabbari et al., "Towards the Orwellian nightmare: separation of business and personal emails", Jul. 2006, Proceedings of the COLING/ACL on Main conference poster sessions, Association for Computational Linguistics, pp. 407-411.
Jasleen Kaur et al., "Emotion detection and sentiment analysis in text corpus: a differential study with informal and formal writing styles", Sep. 2014, International Journal of Computer Applications, vol. 101, No. 9, pp. 1-9.
Shibamouli Lahiri, "SQUINKY! A Corpus of Sentence-level Formality, Informativeness, and Implicature", arXiv:1506.02306v1, Jun. 7, 2015, 12 pages.
Sisi Liu and Ickjai Lee, "A hybrid sentiment analysis framework for large email data", Nov. 2015, Intelligent Systems and Knowledge Engineering, 2015 10th International Conference on Intelligent Systems and Knowledge Engineering, 7 pages.
Scott W. Mcquiggan et al., "Early Prediction of Student Frustration", 2007, Springer Berlin Heidelberg, Berlin, Heidelberg, 12 pages.
Saif M. Mohammad et al., "NRC Emotion Lexicon", 2013, Technical Report. NRC Technical Report, 2 pages.
Saif M. Mohammad and Tony Yang, "Tracking sentiment in mail: How genders differ on emotional axes", Jun. 24, 2011, Proceedings of the 2nd Workshop on Computational Approaches to Subjectivity and Sentiment Analysis, Association for Computational Linguistics, Portland, OR, pp. 70-79.
Myriam D. Munezero et al., "Are They Different? Affect, Feeling, Emotion, Sentiment, and Opinion Detection in Text", Apr. 2014, IEEE Transactions on Affective Computing vol. 5, Issue 2, 12 pages.
Brandon Oselio et al., "Multi-layer graph analysis for dynamic social networks", 2014, arXiv: 1309:5124v2, May 12, 2014, 10 pages.
Ellie Pavlick et al., "An Empirical Analysis of Formality in Online Communication", Mar. 2016, Transactions of the Association for Computational Linguistics, vol. 4, pp. 61-74.
Kelly Peterson et al., "Email Formality in the Workplace: A case study on the Enron Corpus", Proceedings of the Workshop on Languages in Social Media, Jun. 23, 2011, Association for Computational Linguistics, pp. 86-95.
Vinodkumar Prabhakaran et al., "Annotations for Power Relations on Email Threads", Jan. 2012, LREC, 6 pages.
Jennifer Sabourin et al., "Modeling Learner Affect with Theoretically Grounded Dynamic Bayesian Networks", 2011, ACII 2011, Lecture Notes in Computer Science, vol. 6974, Springer, Berlin, Heidelberg, 10 pages.
H. Andrew Schwartz et al., "Personality, Gender, and Age in the Language of Social Media: The Open-vocabulary Approach", Sep. 2013, PlOS One, vol. 8, Issue 9, e73791, pp. 1-16.

(56) References Cited

OTHER PUBLICATIONS

Jitesh Shetty et al., "Discovering Important Nodes through Graph Entropy the Case of Enron Email Database", 2005, Proceedings of the 3rd international workshop on Link discovery (LinkKDD '05), ACM, New York, NY, 8 pages.

Hua Wang et al., "Communicating Emotions in Online Chat Using Physiological Sensors and Animated Text", Apr. 24-29, 2004, CHI '04 Extended Abstracts on Human Factors in Computing Systems (CHI EA '04), ACM, New York, NY, 4 pages.

Amy Beth Warriner et al., "Norms of valence, arousal, and dominance for 13,915 English lemmas", Behavior Research Methods, Dec. 2013, vol. 45, 35 pages.

Yingjie Zhou et al., "Automatic Text Analysis of Values in the Enron Email Dataset: Clustering a Social Network Using the Value Patterns of Actors", 2010, Proceedings of the 43rd Hawaii International Conference on System Sciences (HICSS), IEEE, 10 pages.

Jana Diesner and Craig S Evans, Little bad concerns: Using sentiment analysis to assess structural balance in communication networks:, In Advances in Social Networks Analysis and Mining (ASONAM), 2015 IEEE/ACM International Conference on. IEEE, pp. 342-348.

Iris Bakker et al., "Pleasure, Arousal, Deominance: Mehrabian and Russell revisited", Curr Psychol, Springer, Jun. 11, 2014, 17 pages.

Christopher A Miller and Jeffrey Rye, "Power and Politeness in Interactions: ADMIRE—A Tool for Deriving the Former from the Latter", 2012, In Social Informatics (SocialInformatics), 2012 International Conference on. IEEE, 177-184.

R Miller and Eya Charles, "A psychological based analysis of marketing email subject lines", 2016, In Advances in ICT for Emerging Regions (ICTer), 2016 Sixteenth International Conference on. IEEE, 58-65.

Martin Seligman, "Flourish: A Visionary New Understanding of Happiness and Well-Being", 2011, Policy 27, 3 (2011), 60-1.

Robert Sigley, "Text categories and where you can stick them: a crude formality index", International Journal of Corpus Linguistics 2, 1997, pp. 199-237.

Lisa M Vizer et al., "Automated stress detection using keystroke and linguistic features: An exploratory study", 2009, International Journal of Human-Computer Studies, vol. 67, pp. 870-886.

IBM Cloud Docs / Tone Analzer, "The Science Behind the Service", retrieved from https://cloud.ibm.com/docs/services/tone-analyzer/science.html#the-science-behind-the-service (last updated 2018).

\* cited by examiner

| Features | Feature list |
| --- | --- |
| Lexical | Average Word Length, Average Words per Sentence, # of Upper Case Words, # Ellipses, # Exclamation marks, # Question Mark, # Multiple Question Marks, # Words, # Lower Case words, First word upper case, # NonAlphaChars, # Punctuation Chars |
| Syntactic | # BlankLines, NER-Person, NER-Location, NER-PersonLength, NER-Organization, TextDensity |
| Derived | # Contractions, ReadabilityScore- FKgrade, FirstPerson, Hedge, Subjectivity, Sentiment, ThirdPerson, SignOff |
| Psycho-linguistic | ANEW-arousal, ANEW-dominance, ANEW-valence, EmolexIntensity-anger, EmolexIntensity-fear, EmolexIntensity-joy, EmolexIntensity-sadness, Emolex-anger, Emolex-anticipation, Emolex-disgust, Emolex-fear, Emolex-joy, Emolex-negative, Emolex-positive, Emolex-sadness, Emolex-surprise, Emolex-trust, Perma-NEG-A, Perma-NEG-E, Perma-NEG-M, Perma-NEG-P, Perma-NEG-R, Perma-POS-A, Perma-POS-E, Perma-POS-M, Perma-POS-P, Perma-POS-R |
| Formal Words | formal-words, informal-words |

FIG. 2

Algorithm 1 Extracting ANEW features

1: procedure ANEW-FEATURES(*text, lexicons*)
2:  words = nltk.word_tokenize(text)
3:  dimensions = ["valence","arousal","dominance"]
4:  affect = [0,0,0]
5:  count = 0
6:  numAffects = len(affect)
7:  for word in words do
8:   if word.isalpha() then
9:    if word in lexicons.keys() then
10:     emolist = lexicons[word]
11:     affect[0] += emolist[0]
12:     affect[1] += emolist[1]
13:     affect[2] += emolist[2]
14:     count += 1
15:  if count != 0 then
16:   affect = [i/count for i in affect]
17:  features = {}
18:  index = 0
19:  while $index \leq numAffects$ do
20:   features[dimensions[index]] = affect[index]
21:   index += 1
22:  return features

FIG. 3

List of Hedge Words and Phrases

"think", "thought", "thinking", "almost", "apparent", "apparently", "appear", "appeared", "appears", "approximately", "around", "assume", "assumed", "certain amount", "certain extent", "certain level", "claim", "claimed", "doubt", "doubtful", "essentially", "estimate", "estimated", "feel", "felt", "frequently", "from our perspective", "generally", "guess", "in general", "in most cases", "in most instances", "in our view", "indicate", "indicated", "largely", "likely", "mainly", "may", "maybe", "might", "mostly", "often", "on the whole", "ought", "perhaps", "plausible", "plausibly", "possible", "possibly", "postulate", "postulated", "presumable", "probable", "probably", "relatively", "roughly", "seems", "should", "sometimes", "somewhat", "suggest", "suggested", "suppose", "suspect", "tend to", "tends to", "typical", "typically", "uncertain", "uncertainly", "unclear", "unclearly", "unlikely", "usually", "broadly", "tended to", "presumably", "suggests", "from this perspective", "from my perspective", "in my view", "in this view", "in our opinion", "in my opinion", "to my knowledge", "fairly", "quite", "rather", "argue", "argues", "argued", "claims", "feels", "indicates", "supposed", "supposes", "suspects", "postulates"

FIG. 4

PREDICTION OF TONE OF INTERPERSONAL TEXT COMMUNICATIONS

FIELD OF THE DISCLOSURE

This disclosure relates generally to text analysis, and more particularly, to predicting tone of interpersonal text communications.

BACKGROUND

Emotional states, also known as moods, are central to the expression of thoughts, ideas, and opinions, and in turn impact attitudes and behavior of the recipient of the expression. Mood refers to a generalized state of feeling, and is closely related to the concepts of affect and emotion. With respect to interpersonal text communications, the mood or tone conveyed through a message is important in both communicating information contained in the message as well as portraying the personality of the author of the message. In the case of email or web-related text communications, the language of the message conveys important information regarding the author's needs, requirements, and intentions. The language may also drive the recipient of the message towards an action. For example, a customer care communication directed to an agitated customer may benefit from being "polite" and having a tone that is "apologetic" and "soothing" and not one of "frustration." Similarly, a marketing communication having an "informal" tone may be appropriate to drive younger recipients, as compared to a "formal" tone directed to organizational recipients. As a result, it is often desirable for authors of interpersonal text communications to understand the emotional or tonal aspect of the written text content in these communications. Thus, there is a need for techniques for determining the tone of text content in interpersonal communications.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

FIG. 2 shows a list of 55 example features, in accordance with an embodiment of the present disclosure.

FIG. 3 shows an example algorithm for extracting Affective Norms for English Words (ANEW) features, in accordance with an embodiment of the present disclosure.

FIG. 4 shows a list of example hedge words and phrases, in accordance with an embodiment of the present disclosure.

Figure 1:
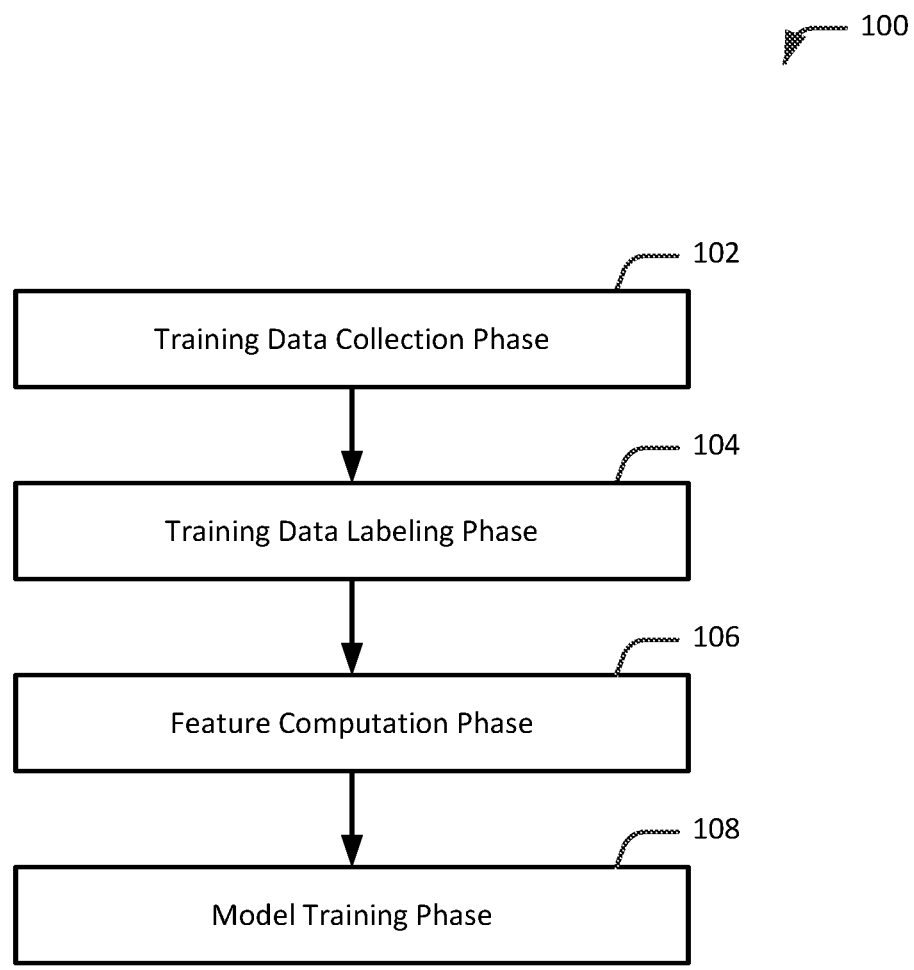
FIG. 1 is a diagram illustrating an example workflow for training a model, in accordance with an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed for predicting tone of interpersonal text communications (also referred to herein as a "text communication" in the singular form for brevity), where the tone is indicated using the affective tone dimensions of frustration, formality, and politeness. The predicted tone may, for instance, facilitate the process of preparing proper text for an intended communication, identifying the correct audiences for the text communication, and the preparation of improved text communications in the general sense. In an embodiment, a multi-phase approach may be utilized to train three models, one each for the affective tone dimensions of frustration, formality, and politeness, using supervised learning. Once trained, the three trained models are able to predict respective measures of frustration, formality, and politeness of a provided text communication. In accordance with an embodiment of the present disclosure, the multi-phase approach generally includes a training data collection phase, a training data labeling phase, a feature computation phase, and a model training phase.

In more detail, in the training data collection phase, a corpus of text communications is obtained from which to generate the labeled training data. The corpus of text communications may include, for example, email communications, website contents, webpage contents, social media contents or communications, blogs, text messages or communications, or any other suitable text communications.

In the training data labeling phase, each text communication of the corpus of text communications may be labeled for each of the three affective tone dimensions frustration, formality, and politeness. In some cases, labeling of the corpus of text communications may be performed through use of crowdsourcing or any other suitable information gathering technique. In one example implementation, the Amazon Mechanical Turk framework is utilized to generate the labels for the corpus of text communications. Amazon Mechanical Turk provides a crowdsourcing marketplace and a diverse, on-demand workforce for performing tasks that require human intelligence. Using a suitable crowdsourcing technique to label the corpus of text communications suitably ensures that the labeling across the aforementioned three dimensions of affective tone depends on human input. The labeled text communications may serve as training samples (e.g., labeled training data) for training the respective models in the model training phase. Each training sample may include, for example, a text communication, and a label indicating a degree of a respective affective tone dimension conveyed by the contents (e.g., text data) of the text communication. For example, a given labeled text communication may be associated with three training samples, one training sample for each of the three affective tone dimensions of frustration, formality, and politeness. As used herein, the term "labeled text communication" refers to a text communication that has associated therewith labels for one or more of the affective tone dimensions frustration, formality, and politeness.

In the feature computation phase, features may be calculated and measured for each text communication, such as the labeled text communications generated in the training data labeling phase. In an embodiment, feature engineering may be utilized to calculate, measure, and otherwise extract the features from the contents of a text communication. The features may, for instance, include psycholinguistic features, lexical features, syntactic features, and derived features. Such features may be determined by analyzing the literal content (e.g., text) and/or non-literal content (e.g., structure) of a text communication. Psycholinguistic features quantify the amount or degree of affective content that is present in (or exhibited by) a text communication. In an example implementation, the psycholinguistic features may be determined based on the presence of words in the text communication that also appear in various lexicons. Lexical features capture various counts associated with the contents of the text communication. Examples of such counts include number of words, average words per sentence, number of upper case words, and number of lower case words, to name four examples. Syntactic features characterize the structure of the contents of a text communication. Examples of structural information include presence of named entities, number of blank lines, and text density, to name three examples. Derived features quantify the readability of the contents of the text communication. Examples of derived features include readability index, presence of hedge words, and presence of subjective words, to name three examples. The features extracted from a text communication can then be used to generate a feature vector for the text communication.

In the model training phase, three models may be trained using supervised learning to predict respective measures of each of the three affective tone dimensions of frustration, formality, and politeness, for a text communication having unknown tone. More specifically, a first model may be trained using a set of training samples for the affective tone dimension frustration, a second model may be trained using a set of training samples for the affective tone dimension formality, and a third model may be trained using a set of training samples for the affective tone dimension politeness. In some embodiments, the models may be regression models that are trained to predict the degree of frustration, formality, and politeness, respectively, of a provided text communication. Additionally or alternatively, the models may be machine learning models that are trained to predict whether a provided text communication is frustrating, formal, and polite, respectively.

The disclosed techniques significantly improve the efficiency and accuracy in determining a tone of a text communication. For example, in certain embodiments, the techniques facilitate a quantitative analysis of a text communication to provide an improved and efficient prediction of tone. By utilizing psycholinguistic features obtained from the text communication that can help model the affective tone, the disclosed techniques provide a more accurate prediction of the tone of the text communication, as compared to existing techniques. Also, using psycholinguistic features to determine the tone of a text communication advantageously provides an indication of affective content in the text communication in a way existing techniques that fail to consider the psycholinguistic aspects of a text communication cannot. These and other advantages and alternative embodiments will be apparent in light of this disclosure.

As used herein, the term "psycholinguistic feature" refers, in addition to its plain and ordinary meaning, to a distinctive attribute or an aspect that helps to capture a human reaction. In the context of a text communication, psycholinguistic features capture information as to what words in the text communication help capture human reaction. Psycholinguistic features help capture the psychological preferences of users (e.g., readers, writers, etc.) based on the language used in the text communication. Often, but not necessarily, psycholinguistic features are lexica-based and quantify the amount of affective content present in the contents of a text communication.

As used herein, the term "crowdsourcing" refers, in addition to its plain and ordinary meaning, to the practice of obtaining and utilizing information or services from a large group of people. Often, but not necessarily, the people engaged in a crowdsourcing activity are members of the general public, people who are not working collaboratively, or people who otherwise have no obligations with respect to others involved in the crowdsourcing activity. Such groups of people can provide results that are beneficial in a number of ways. For example, when the participants of a crowdsourcing activity perform a task independently of one another, it is more likely that the results will reflect the natural behaviors of the participants because each participant has little or no influence over the behavior of other participants. Also, when labeling an interpersonal text communication, the annotators (labelers) are able to provide their own subjective perceptions of the tone of the interpersonal text communication. This can provide labels that can serve as ground truth data for training models to predict the tone of interpersonal communications.

As used herein, the term "tone" refers, in addition to its plain and ordinary meaning, to an expression of affects or feelings. In the context of a text communication, tone may refer to an attitude of an author of the text communication toward a recipient or an audience of the text communication. In text communications, tone is generally conveyed through the choice of words (e.g., word usage, sentence formations, lexical content, etc.), or the viewpoint of the author regarding a particular subject. In some cases, tone may be indicated using any one or more of the affective tone dimensions frustration, formality, and politeness. For instance, an email that addresses the recipient in a honorific manner (e.g., "Dear Mr. Smith") and/or that uses deferential sentence structures (e.g., "Would you please . . . " or "We kindly ask that you . . . ") could be interpreted as being written in a formal and/or polite tone. Likewise, an email that has phrases written in all capital letters, and/or that uses repeated exclamation points (e.g., "You MUST remit payment immediately!!!") could be interpreted as being written with a frustrated and/or impolite tone.

As used herein, the term "text communication" refers, in addition to its plain and ordinary meaning, to a communication between one entity and another entity through the use of text (e.g., written words). That is, the medium of communication in text communication is primarily written words. Notwithstanding, text communication may also include other types of contents, such as image, voice, and video, to name three examples, in addition to text. Examples of text communications include emails, website contents, webpage contents, social media posts, blogs, and text messages. Often, but not necessarily, a text communication may be an interpersonal text communication in that the communication is between people.

As used herein, the term "feature vector" refers, in addition to its plain and ordinary meaning, to a multi-dimensional vector of elements or components that represent some object. As an example, the elements or components may, for instance, be name-value pairs, such as Sentence_Length=20, Spelling_Ratio=0.98, All_Caps=False, and the like. In the context of a text communication, a feature vector may represent the contents of the text communication, where each position in the vector corresponds to a variable or feature of the text communication. A variable or feature of a text communication is an individual measurable attribute or property of the text communication. As such, a feature vector is generally a representation of the text communication. One example of a feature vector of a text communication is a combination or concatenation of some or all of the psycholinguistic features, lexical features, syntactic features, derived features, and formality features extracted from the contents of the text communication. A feature vector may be used for training models to predict the tone of interpersonal communications.

As used herein, the term "trained prediction module" refers, in addition to its plain and ordinary meaning, to a prediction module that is trained to predict a tone dimension of a provided text communication. Examples of tone dimensions include frustration, formality, and politeness. In some cases, a prediction module may include a regression model, and a trained prediction module may predict a degree of a tone dimension of a provided text communication. In other cases, a prediction module may include a machine learning model, and the trained prediction module may predict a tone dimension of a provided text communication. In a more general sense, the trained prediction module is trained using training samples to predict a tone dimension of a provided text communication, where each training sample includes a feature vector of a text communication, and a label (e.g., ground truth) that indicates a degree of a tone dimension of the text communication. As an example, a prediction module may be a regression model trained using training samples for the tone dimension frustration, in which case the trained prediction module may predict a degree of frustration in a provided text communication. As another example, a prediction module may be a machine learning model trained using training samples for the tone dimension formality, in which case the trained prediction module may predict whether a provided text communication is formal. In a more general sense, a prediction module is trained using training samples for a specific tone dimension, and the trained prediction module predicts, for a provided text communication, a tone dimension as determined by the training samples used to train the trained prediction module.

FIG. 1 is a diagram illustrating an example workflow 100 for training a model, in accordance with an embodiment of the present disclosure. As depicted, workflow 100 includes a training data collection phase 102, a training data labeling phase 104, a feature computation phase 106, and a model training phase 108. In more detail, training data collection phase 102 includes collecting a corpus of text communications to use as labeled training data (e.g., set or sets of training samples) for training one or more models to predict respective measures of affective tone of a provided text communication. The corpus of text communications, which may include readily available text communications, such as email communications, website contents, webpage contents, social media contents, blogs, or any other types of suitable text communication, may be obtained from any commercial or public sources. In some cases, the corpus of text communications may include a dataset of workplace email communications by and between employees of a company. In the case of emails, each email may include sender-receiver information along with the text data contained in an email body. In some such cases, each email may be cleaned so that only the text data in the email body remains. For example, each email may be cleaned by removing the sender-receiver information portion from the email. While it is not necessary to clean the emails, doing so may eliminate any identifiable and/or extraneous information that may unduly influence the annotators in labeling the emails. In a similar manner, text communications of other types may also be similarly cleaned. In any case, a large number and, in some cases, a very large number of text communications may be collected from which to generate the labeled training data.

Training data labeling phase 104 includes labeling each text communication in the collected corpus of text communications for one or more of the three affective tone dimensions of frustration, formality, and politeness. As noted above, crowdsourcing, such as Amazon Mechanical Turk, or any other suitable crowdsourcing technique, may be used to label the collected corpus of text communications to generate the label training data. In order to perform the crowdsourcing, each text communication in the corpus of text communications may be cleaned and provided to a suitable number of annotators with instructions to label each provided text communication for each of the three affective tone dimensions of frustration, formality, and politeness. In one example use case, for instance, each text communication is provided to at least ten annotators. Note that in other cases, each text communication may be provided to a different number of annotators, such as at least three annotators, at least four annotators, at least seven annotators, or any other suitable number of annotators. Further note that each text communication may be provided to different sets of annotators. For example, a first text communication may be provided to a first set of annotators, and a second text communication may be provided to a second set of annotators. In any case, the annotators are not provided formal definitions of frustration, formality, and politeness, but, instead, instructed to use their instincts and/or perceptions (e.g., their own definitions) in labeling the provided text communications. In some cases, the annotators may be provided a brief description of frustrating language, formal language, and polite language, so as to remove confusion between the three affective tone dimensions of frustration, formality, and politeness.

The annotators are also instructed to label each provided text communication for each of the three affective tone dimensions on a respective Likert scale. Likert scales are a common ratings format for surveys. For the affective tone dimension frustration, for instance, the annotators are instructed to score (rate) each provided text communication on a Likert scale of −2 to 0, where −2 indicates very frustrated, −1 indicates frustrated, and 0 indicates not frustrated. For the affective tone dimension formality, the annotators are instructed to score each provided text communication on a Likert scale of −2 to 2, where −2 indicates very informal, −1 indicates somewhat informal, 0 indicates neutral, 1 indicates somewhat formal, and 2 indicates very formal. For the affective tone dimension politeness, the annotators are instructed to score each provided text communication on a Likert scale of −2 to 2, where −2 indicates very impolite, −1 indicates somewhat impolite, 0 indicates neutral, 1 indicates somewhat polite, and 2 indicates very polite. That is, the affective tone dimensions formality and politeness follow a 5 point Likert scale, for example, from −2 to 2, where both extremes of the scale mark the higher degree of absence or presence of the respective affective tone dimension.

For the affective tone dimension frustration, the annotators are not requested to provide a measure or degree of non-frustration. In some embodiments, the annotators may be instructed to score each provided text communication on a Likert scale that includes a measure for a degree of frustration, such as frustrated and very frustrated, to provide two examples.

Note that, in some cases, an annotator may not be instructed to provide three labels, one label for each of the three affective tone dimensions, for a provided text communication. In some cases, for instance, an annotator may be provided a text communication, and instructed to label the provided text communication for one or two of the three affective tone dimensions.

In an example embodiment, a mean of ten annotator scores (e.g., scores from ten annotators) may be used as a representative score of an affective tone dimension for a text communication. Taking the affective tone dimension formality as an example, a given text communication may have been provided to ten (or more) annotators, and each annotator may have provided a formality score for the given text communication, as described above. In this example, a mean of the ten formality scores provided by the ten annotators may be used as a representative formality score for the given text communication. In cases where more than ten formality scores are obtained for the given text communication (e.g., the given text communication is provided to more than ten annotators), the ten formality scores with which to generate the representative formality score may be randomly selected. Likewise, a mean of the ten frustration scores provided by ten annotators may be used as a representative frustration score for a given text communication, and a mean of the ten politeness scores provided by ten annotators may be used as a representative politeness score for a given text communication. In any case, each text communication may have one, two, or three representative scores (e.g., a representative score of the affective tone dimension frustration, a representative score of the affective tone dimension formality, and a representative score of the affective tone dimension politeness). In some embodiments, a mean of any other suitable number of annotator scores, such as two, four, five, or any other suitable number, may be used as a representative score of an affective tone dimension for a text communication.

As described previously, the three affective tone dimensions frustration, formality, and politeness may be measured using different scales. For example, the affective tone dimension frustration and each of the affective tone dimensions formality and politeness may be scored using a Likert scale of −2 to 0 and a Likert scale of −2 to +2, respectively. As a result of using the different scales, the representative scores of the respective affective tone dimensions may not be comparable with each other. In order to make the representative scores of the affective tone dimensions comparable, in some embodiments, the representative score of each affective tone dimension for a given text communication may be normalized to a common scale, such as to a scale from 0 to 1. In the normalized scale from 0 to 1, 1 indicates the highest degree of the affective tone dimension being considered. For example, each representative affective tone dimension score for each text communication may be normalized to a scale from 0 to 1 using the following normalization function:

$$y_{normalized} = \frac{\text{item} - \min(y)}{\max(y) - \min(y)} \text{ for an item in } y$$

where min(y) is the minimum value of an affective tone dimension y in the annotated data (e.g., the item of text communication), and max(y) is the maximum value for the affective tone dimension y.

Using the above normalization function, three normalized scores, one each for the affective tone dimensions frustration, formality, and politeness, can be generated for a labeled text communication. Moreover, the three normalized scores can serve as respective ground truths for the three affective tone dimensions frustration, formality, and politeness. Accordingly, a training sample may include, for example, a text communication, and a normalized score for an affective tone dimension, where the normalized score serves as a ground truth for the affective tone dimension. Moreover, the normalized score may serve as a label, and provide an indication of the degree of the affective tone dimension conveyed by the contents of the text communication. As will be further described below, text communications in training samples may be represented by a respective feature vector that represents the contents of the text communication. Accordingly, a training sample may include, for example, a feature vector that represents the contents of a text communication, and a ground truth for an affective tone dimension.

Feature computation phase 106 includes calculating, measuring, and otherwise extracting features from the contents of a text communication, such as a labeled text communication. In some embodiments, the contents of a text communication may be converted into a form that is conducive for feature extraction. For example, the conversion can include any or all of converting the characters in the contents to a common case (e.g., uppercase or lowercase), determining the lemmas (e.g., base forms) of the words in the contents, determining n-grams, and so on. In an example embodiment, feature engineering may be utilized to extract 55 features from the contents of a text communication for, in some instances, use in generating a feature vector for the text communication. FIG. 2 shows a list of 55 example features, in accordance with an embodiment of the present disclosure. The features may be determined by analyzing the literal content (e.g., text) and/or non-literal content (e.g., structure) of a text communication. As shown in the list in FIG. 2, the 55 features are categorized into four sub-groups of features and two formality features ("Formal Words"). The four sub-groups of features include psycholinguistic features, lexical features, syntactic features, and derived features.

The psycholinguistic features are lexica-based and quantify the amount of affective content present in the contents of a text communication. In a general sense, the psycholinguistic features capture information as to what words in the text communication help capture human reaction. In an embodiment, the psycholinguistic features include a set of Affective Norms for English Words (ANEW) features, a set of NRC Word-Emotion Lexicon (Emolex) features, and a set of Positive Emotion, Engagement, Relationships, Meaning, and Accomplishment (PERMA) features. The ANEW features, Emolex features, and PERMA features are included in the list shown in FIG. 2.

The set of ANEW features capture the intensity of valence, arousal, and dominance in text (e.g., words in the contents of a text communication). Valence refers to the pleasantness of a word. Arousal refers to the intensity of emotion provoked by a word. Dominance refers to the degree of control exerted by a word.

In an example implementation, the ANEW features may be extracted from the contents of a text communication based on Warriner's lexicon. Warriner's lexicon includes approximately 14,000 English words and associated ratings, which indicate the extent of valence, arousal, and dominance for each word. Each word in the lexicon is provided ratings on three dimensions, valence, arousal, and dominance. The valence rating is on a 9-point happy-unhappy scale, and indicates the degree of pleasantness evoked by a word. The happy-unhappy scale ranges from 1, which indicates happy, to 9, which indicates unhappy. The arousal rating is on 9-point excited-calm scale, and indicates the degree of arousal evoked by a word. The excited-calm scale ranges from 1, which indicates excited, to 9, which indicates calm. The dominance rating is on a 9-point controlled-in control scale, and indicates the forcefulness of the affect expressed by a word (e.g., the extent to which the word denotes something that is dominant/strong or submissive/weak). The controlled-in control scale ranges from 1, which indicates controlled, to 9, which indicates in control. In each of the three scales, a neutral rating, such as, neither happy nor sad, not excited nor at all calm, and neither in control nor controlled, may be indicated by a rating of 5. As such, each word in the lexicon is associated with a rating for three dimensions (i.e., valence rating, an arousal rating, and a dominance rating).

In the example implementation above, the ANEW features may be extracted from the contents of the text communication by parsing the contents of the text communication, identifying the words in contents that are also in the lexicon, and, for each identified word, generating three scores for the word as specified by the valence rating, arousal rating, and dominance rating associated with the word in the lexicon. The scores may be maintained in a 3-dimensional vector, where each dimension includes the rating for each one of the features valence, arousal, and dominance. An example algorithm for extracting the ANEW features from the contents of a text communication is shown in FIG. 3.

The set of Emolex features capture the intensity of eight basic emotions (joy, fear, anger, sadness, anticipation, trust, disgust, and surprise) in text (e.g., words in the contents of a text communication). In a general sense, the Emolex features capture the eight basic emotions and quantify whether a given piece of text (e.g., word) will invoke trust in the reader.

In an example implementation, the Emolex features may be extracted from the contents of a text communication based on the Emolex lexicon. The Emolex lexicon includes approximately 14,000 English words. Each word in the lexicon is provided a pair of ratings for each of the eight dimensions, joy, fear, anger, sadness, anticipation, trust, disgust, and surprise. Of the pair of ratings for each dimension, the first rating is a binary rating that indicates the existence (rating of 1) or non-existence (rating of 0) of dimension in a word, and the second rating is on a 2-point scale ranging from 0 to 1 that indicates the intensity of the dimension evoked by the word. The 2-point scale ranges from 0, which indicates not intense, to 1, which indicates highly intense. The intensity rating is a measure of how strongly the word is associated with the dimension. In each intensity scale, a neutral or middle intensity may be indicated by a rating of 0.5. As such, each word in the lexicon may be associated with sixteen ratings.

In the example implementation above, the Emolex features may be extracted from the contents of a text communication by parsing the contents of the text communication, identifying the words in contents that are also in the lexicon, and, for each identified word, generating sixteen scores for the word as specified by the pair of ratings for each of the eight dimensions. The scores may be maintained in eight vectors, where each vector indicates whether one of the dimensions exists in the word and the intensity rating for the dimension. An algorithm similar to the algorithm shown in FIG. 3 modified to process the appropriate number of dimensions may be used to extract the Emolex features from the contents of a text communication.

The set of PERMA features capture five measureable elements that contribute to a sense of well-being. The features include positivity (P), engagement (E), relationship (R), meaning (M), and accomplishments (A). In a general sense, PERMA is a psychological model, and the features attempt to quantify the type of personality that will be attracted to or will resonate with a given piece of text (e.g., word).

In an example implementation, the PERMA features may be extracted from the contents of a text communication based on the PERMA lexicon. The PERMA lexicon includes approximately 1,500 English words. Each word in the lexicon is provided a pair of ratings for each of the five dimensions, positivity, engagement, relationship, meaning, and accomplishments. Of the pair of ratings for each dimension, the first rating is on a 2-point positivity scale that indicates the positivity of the dimension in a word, and the second rating is on a 2-point negativity scale that indicates the negativity of the dimension in the word. The positivity scale ranges from 0, which indicates not very positive, to 1, which indicates very positive. The negativity scale ranges from 0, which indicates not very negative, to 1, which indicates very negative. In each scale, a neutral rating, such as, positive and negative, may be indicated by a rating of 5. As such, each word in the lexicon may be associated with ten ratings.

In the example implementation above, the PERMA features may be extracted from the contents of a text communication by parsing the contents of the text communication, identifying the words in contents that are also in the lexicon, and, for each identified word, generating ten scores for the word as specified by the pair of ratings for each of the five dimensions. The scores may be maintained in ten vectors, where each vector indicates either the positivity or negativity of one of the dimensions in a word. An algorithm similar to the algorithm shown in FIG. 3 modified to process the appropriate number of dimensions may be used to extract the PERMA features from the contents of a text communication.

As described above, the psycholinguistic features may be scored using different scales. For example, the ANEW features may be scored using a scale from 1 to 9, and the Emolex features and the PERMA features may be scored using a scale from 0 to 1. As a result of using the different scales, the scores for the ANEW features may not be comparable with the scores for the Emolex features and the PERMA features. In order to make the scores for the psycholinguistic features comparable, in some embodiments, the scores for the ANEW features may be normalized to the common scale from 0 to 1 using any suitable technique.

The lexical features capture various counts associated with the contents of a text communication. The lexical features are distinguishable from the psycholinguistic features described previously. In a general sense, the lexical features capture information regarding the surface characteristics of the contents of a text communication without the need to read or understand the words in the text communication. In an embodiment, the lexical features include average word length, average words per sentence, number of upper case words, number of ellipses, number of exclamation marks, number of question marks, number of multiple questions marks, number of words, number of lower case words, first word uppercase, number of non-alphanumeric characters, and number of punctuation characters, as shown in the list in FIG. 2.

In an example implementation, the lexical features may be extracted from the contents of a text communication by parsing the contents of the text communication, and determining a count for each lexical feature from the contents of the text communication. As an example, the words in the contents of a text communication can be counted to determine the number of words. As another example, an average of the number of words in each sentence in the contents of a text communication can be calculated to determine the average words per sentence. As still another example, an average of the number of characters in each word in the contents of a text communication can be calculated to determine the average words length. In a similar manner, respective counts for the other lexical features may be determined. The determined count for each of the lexical features may be maintained in a respective vector.

The syntactic features capture various counts associated with the arrangement of the contents of a text communication. The syntactic features are distinguishable from the psycholinguistic features and the lexical features described previously. In a general sense, the syntactic features capture structural information regarding the contents of a text communication. In an embodiment, the syntactic features include the Named-entity recognition (NER)-based features (NER-person, NER-location, NER-Organization, and NER-PersonLength), number of blank lines, and text density, as shown in the list in FIG. 2.

In an example implementation, the syntactic features may be extracted from the contents of a text communication by parsing the contents of the text communication, and determining a count or numerical information for each syntactic feature from the contents of the text communication. As an example, the blank lines in the contents of a text communication can be counted to determine the number of blank lines. As another example, for each of the NER-based features, the contents of a text communication can be parsed to determine the presence (or absence) of the NER-based feature. The text density of the contents of a text communication can be calculated using the following equation:

$$\rho = \frac{\#(sentences)}{1 + \#(lines)}$$

where $\rho$ is the text density, #(sentences) denotes the number of sentences in the content, and #(lines) refers to the number of lines, including blank lines, in the text communication. The determined count or numerical information for each of the syntactic features may be maintained in a respective vector.

The derived features capture information associated with the contents of a text communication. The derived features are distinguishable from the psycholinguistic features, the lexical features, and the syntactic features described previously. In a general sense, the derived features focus on the readability aspect of the contents of a text communication. In an embodiment, the derived features include number of contractions, existences of hedges, subjectivity, sign-off, first person, and third person, and readability score, as shown in the list in FIG. 2. Existences of hedges, subjectivity, sign-off, first person, and third person may be considered binary features, where a value of 0 indicates non-existence and a value of 1 indicates existence.

In an example implementation, the derived features may be extracted from the contents of a text communication by parsing the contents of the text communication, and determining a count or numerical information for each derived feature from the contents of the text communication. As an example, the contractions in the contents of a text communication can be counted to determine the number of contractions. As another example, the existence of hedges in the contents of a text communication may be determined by comparing the words in the contents to known hedge words and phrases. FIG. 4 shows a list of example hedge words and phrases, in accordance with an embodiment of the present disclosure. Similarly, the existence of subjectivity in the contents of a text communication may be determined by comparing the words in the contents to known subjective words and phrases. As another example, existences of sign-off, first person, and third person in the contents of a text communication may be determined by parsing the contents for the existences of a sign-off, first person words, and third person words, respectively. Additionally or alternatively, in some embodiments, a count of one or more of hedge words, subjectivity words, first person words, and third person words may also be determined from the contents of a text communication. In an embodiment, the readability score of the contents of a text communication is determined using the Flesch-Kincaid (FK) grade readability index. The FK grade readability index can be calculated as follows:

$$FK\,Grade = 0.39\frac{words}{sentences} + 11.8\frac{syllables}{words} + 15.59$$

The determined count or numerical information for each of the derived features may be maintained in a respective vector.

The formality features capture information regarding formal words and informal words in the contents of a text communication. The formality features are distinguishable from the psycholinguistic features, lexical features, syntactic features, and the derived features described previously. In an example implementation, the formality features may be extracted from the contents of a text communication by parsing the contents of the text communication, and determining the existence of formal words and informal words in the contents of the text communication based on existing lists of formal and informal words. Additionally or alternatively, in some embodiments, a count of the formal words and informal words may be determined from the contents of a text communication. The existence and determined count of formal words and informal words may be maintained in a respective vector.

Figure 5:
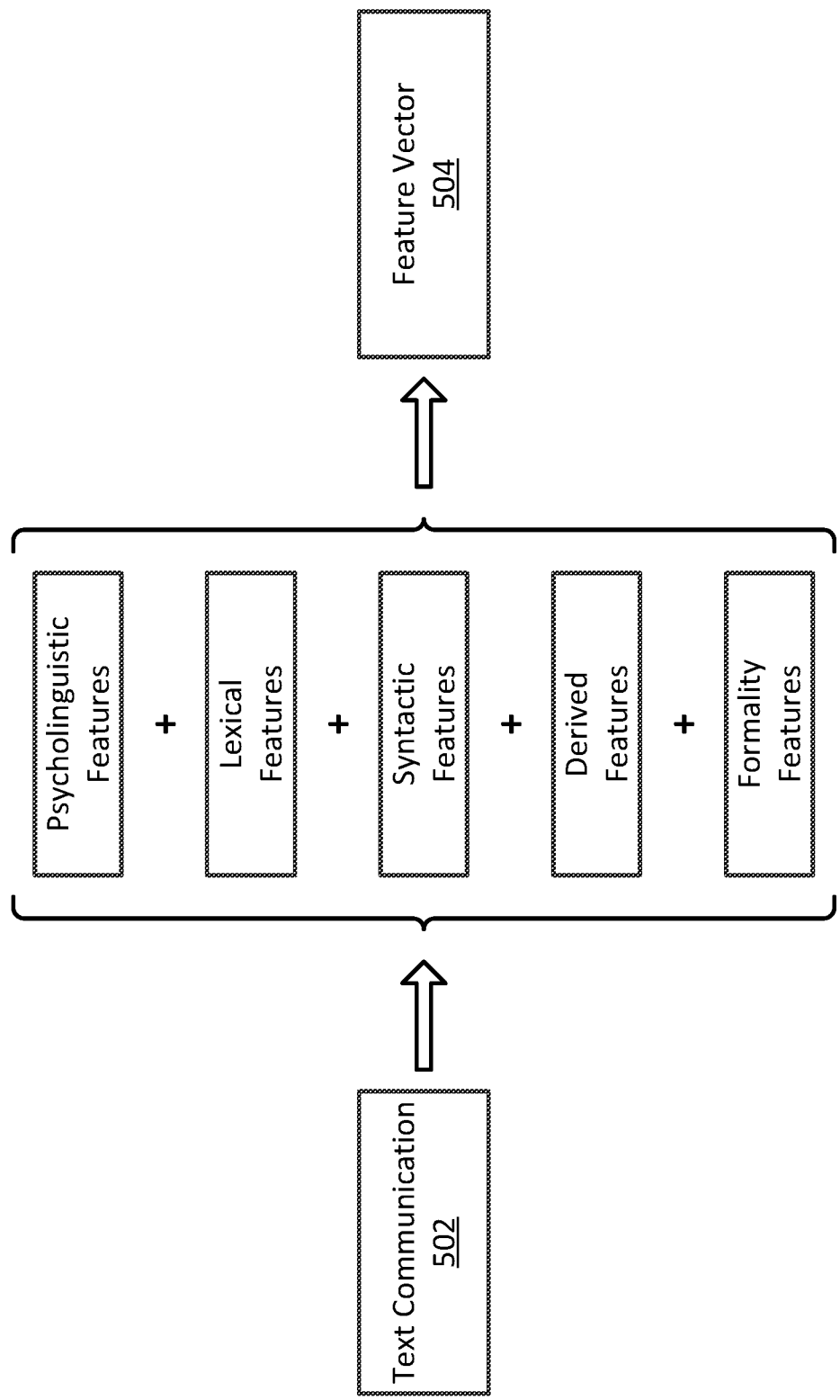
FIG. 5 is a diagram illustrating a feature vector generated for a text communication, in accordance with an embodiment of the present disclosure.

Once the features of the text communication are extracted or otherwise determined, a feature vector may be generated for the text communication based on one or more of the sub-group of psycholinguistic features, the sub-group of lexical features, the sub-group of syntactic features, the sub-group of derived features, and the two formality features. FIG. 5 is a diagram illustrating a feature vector 504 generated for a text communication 502, in accordance with an embodiment of the present disclosure. As shown in FIG. 5, psycholinguistic features, lexical features, syntactic features, derived features, and formality features are extracted from text communication 502, and combined to generate feature vector 504. In an example implementation, the scores generated for the extracted psycholinguistic features, including the normalized scores for the ANEW features, may be concatenated and included in feature vector 504. Further, the counts and numerical information determined for the extracted lexical features, syntactic features, derived features, and formality features, may be concatenated and included in feature vector 504. Accordingly, in a more general sense, a feature vector that represents a text communication includes the psycholinguistic features, lexical features, syntactic features, derived features, and formality features of the text communication.

As will be appreciated, a feature vector generated for a text communication need not include all the psycholinguistic features, lexical features, syntactic features, derived features, and formality features extracted from the text communication. For instance, in some embodiments, a feature vector may be generated using a subset of, and not all, the features extracted from a text communication. For example, a feature vector may be generated using only the psycholinguistic features, the psycholinguistic features and lexical features, the psycholinguistic features and syntactic features, or the psycholinguistic features, lexical feature, and the derived features, to name four examples. As another example, a feature vector may be generated using only a subset of the psycholinguistic features, for instance. In short, any subset of the extracted features including the psycholinguistic features or a subset of the psycholinguistic features can be used to generate a feature vector. Numerous other combinations of subsets of extracted features including the psycholinguistic features or a subset of the psycholinguistic features will be apparent in light of this disclosure.

Model training phase 108 includes training three models using respective training sets comprised of labeled text communications as training samples. Each training sample may include a text communication, and a ground truth indicating a degree of an affective tone dimension conveyed by the contents of the text communication. The ground truths are based on the scores provided by the annotators in training data labeling phase 104 described previously. Also, the affective tone dimension may be frustration, formality, or politeness. As such, according to an embodiment, a first model may be trained using a set of training samples for the affective tone dimension frustration, a second model may be trained using a set of training samples for the affective tone dimension formality, and a third model may be trained using a set of training samples for the affective tone dimension politeness. Once trained using a respective training set, the first trained model is able to predict, provided a text communication, a measure of frustration of the provided text communication; the second trained model is able to predict, provided a text communication, a measure of formality of the provided text communication; and the third trained model is able to predict, provided a text communication, a measure of politeness of the provided text communication.

Figure 6:
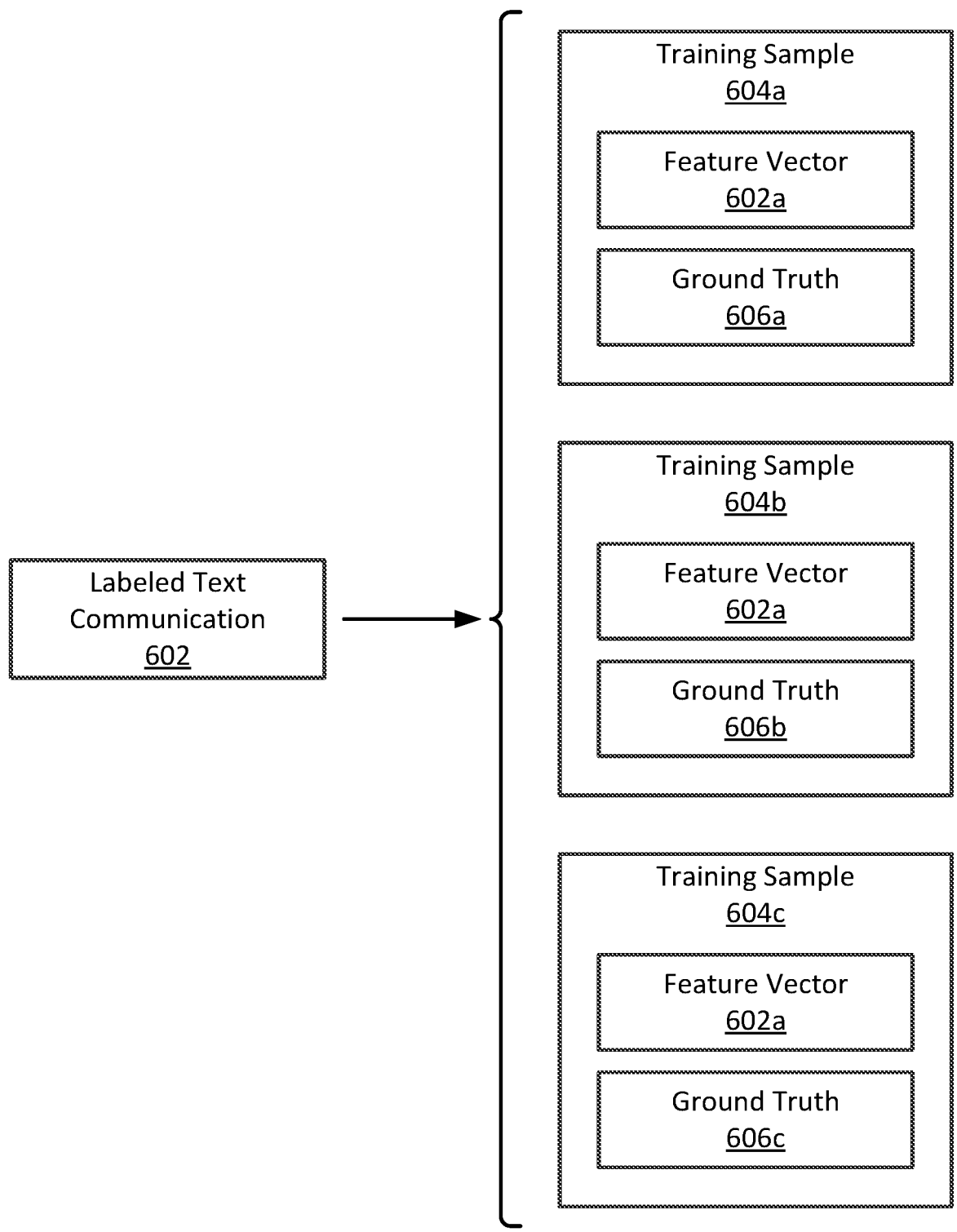
FIG. 6 is a diagram illustrating three training samples generated from a labeled text communication, in accordance with an embodiment of the present disclosure.

FIG. 6 is a diagram illustrating three training samples generated from a labeled text communication, in accordance with an embodiment of the present disclosure. As shown in FIG. 6, three training samples 604a, 604b, and 604c are generated from a labeled text communication 602. Training sample 604a includes a feature vector 602a and a ground truth 606a, training sample 604b includes a feature vector 602a and a ground truth 606b, and training sample 604c includes a feature vector 602a and a ground truth 606c. Feature vector 602a represents the contents of text communication 602, and is included in each training sample 604a, 604b, and 604c. In an example case, training sample 604a may be for the affective tone dimension frustration, training sample 604b may be for the affective tone dimension formality, and training sample 604c may be for the affective tone dimension politeness. In such cases, ground truth 606a is a normalized score for the affective tone dimension frustration generated for text communication 602, ground truth 606b is a normalized score for the affective tone dimension formality generated for text communication 602, and ground truth 606c is a normalized score for the affective tone dimension politeness generated for text communication 602. Furthermore, training sample 604a may be included in a set of training samples used to train a model to predict a measure of frustration of a provided text communication. Similarly, training sample 604b may be included in a set of training samples used to train a model to predict a measure of formality of a provided text communication, and training sample 604c may be included in a set of training samples used to train a model to predict a measure of politeness of a provided text communication. As will be appreciated, in some cases, a text communication may not be labeled for each of the affective tone dimensions frustration, formality, and politeness. For instance, as described previously, an annotator may be provided a text communication, and instructed to label the provided text communication for one or two of the three affective tone dimensions. In such cases, one or two training samples may be generated from the provided text communication. With reference to text communication 602 in FIG. 6, text communication 602 may be labeled, in some instances, to generate any one or two of ground truths 606a, 606b, and 606c. For instance, text communication 602 may be labeled to generate ground truth 606a, ground truth 606b, ground truth 606c, ground truths 606a and 606b, ground truths 606a and 606c, or ground truths 606b and 606c.

Figure 7:
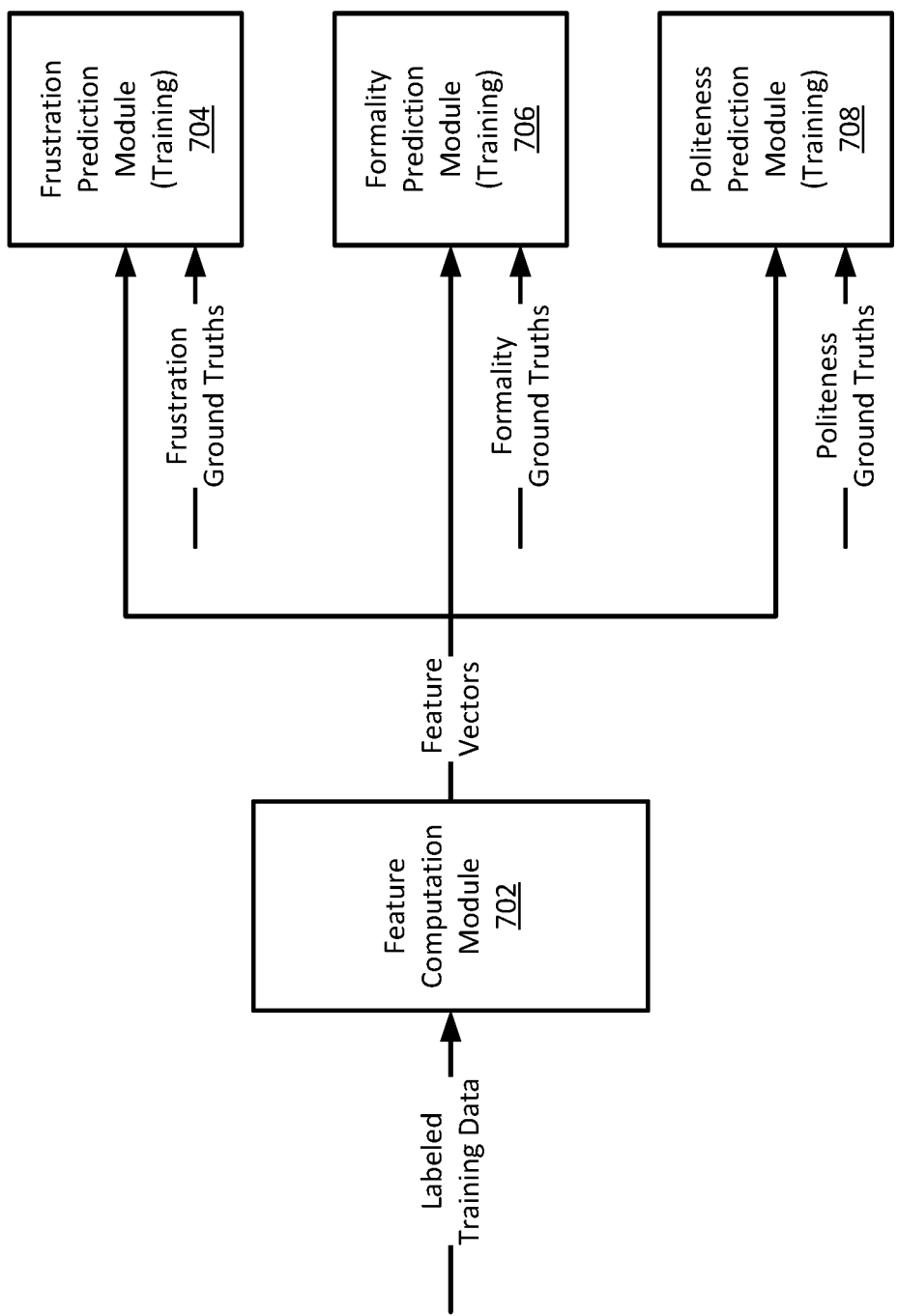
FIG. 7 is a block diagram illustrating an example training of a frustration prediction module, a formality prediction module, and a politeness prediction module, in accordance with an embodiment of the present disclosure.

FIG. 7 is a block diagram illustrating an example training of a frustration prediction module, a formality prediction module, and a politeness prediction module, in accordance with an embodiment of the present disclosure. As shown in FIG. 7, a feature computation module 702 trains a frustration prediction module 704, a formality prediction module 706, and a politeness prediction module 708 for each of the affective tone dimensions frustration, formality, and politeness, respectively. In some embodiments, modules 704, 706, and 708 may implement respective regression models, such as, linear, lasso, ridge, and support vector machine (svr), to name a few examples. In other embodiments, some or all of modules 704, 706, and 708 may implement a machine learning model, such as, support vector machines, random forests, nearest neighbors, and neural networks, to name a few examples. During the model training phase, frustration prediction module 704 is trained to predict a measure of frustration of an input text communication, formality prediction module 706 is trained to predict a measure of formality of an input text communication, and politeness prediction module 708 is trained to predict a measure of frustration of an input text communication. Modules 704, 706, and 708 are each trained using labeled training data generated from a corpus of text communications. To generate the labeled training data, each text communication in the corpus of text communications is labeled using crowdsourcing for one or more of the affective tone dimensions frustration, formality, and politeness.

The labeled training data is provided or otherwise made available to feature computation module 702, and feature computation module 702 determines the text communications component of the labeled training data. For each text communication, feature computation module 702 extracts features from the contents of the text communication, and generates a feature vector for the text communication using the extracted features. The features may include psycholinguistic features, lexical features, syntactic features, derived features, and formality features. Feature computation module 702 may then train modules 704, 706, and 708 using the generated feature vectors and the respective ground truths provided with the labeled training data. Specifically, feature computation module 702 can train frustration prediction module 704 using the generated feature vectors and the ground truths for the affective tone dimension frustration, train formality prediction module 706 using the generated feature vectors and the ground truths for the affective tone dimension formality, and train politeness prediction module 708 using the generated feature vectors and the ground truths for the affective tone dimension politeness.

Figure 8:
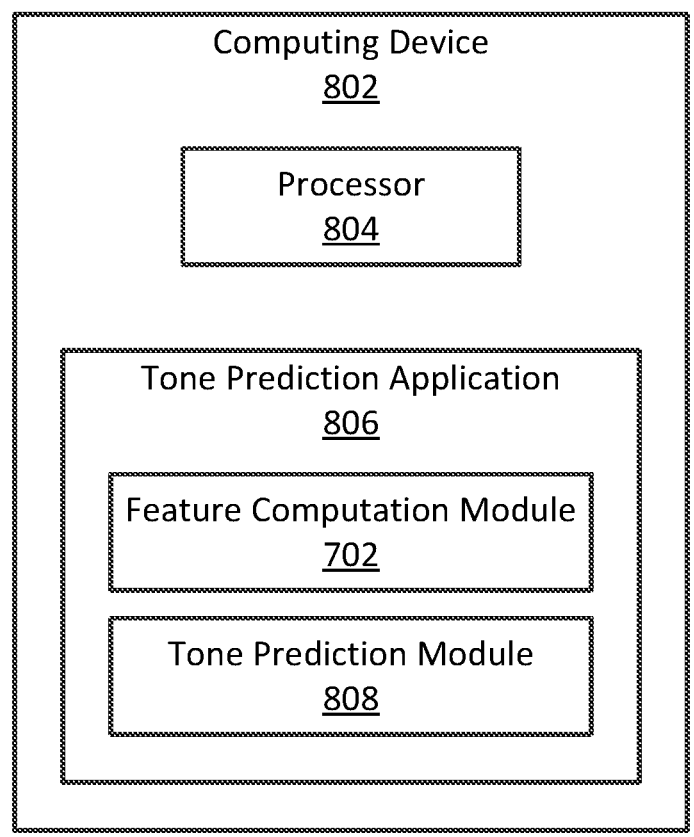
FIG. 8 is a block diagram illustrating selected components of an example tone prediction system, in accordance with an embodiment of the present disclosure.

FIG. 8 is a block diagram illustrating selected components of an example tone prediction system 800, in accordance with an embodiment of the present disclosure. System 800 includes a computing device 802, which includes a processor 804 and a tone prediction application 806. Computing device 802 is configured to execute tone prediction application 806, which includes feature computation module 702 and a tone prediction module 808. In various embodiments, computing device 802 may be a personal computing device, such as a desktop computer, notebook, laptop, smart phone, mobile device, and mobile phone, to name a few examples. In other embodiments, computing device 802 may be a server computing device configured to provide functionality, such as that provided by tone prediction application 806, to other devices and applications. Tone prediction application 806 is configured to provide prediction of tone of text communications as variously described above, and as will be described in further detail below with respect to, for example, FIGS. 9 and 10.

In various embodiments, additional components (not illustrated, such as a display, user input device, non-transitory memory, etc.) or a subset of the illustrated components can be employed without deviating from the scope of the present disclosure. For instance, other embodiments may integrate the various functionalities of modules 702 and 808 into fewer modules (e.g., one) or additional modules (e.g., three or four, or more). In addition, further note that the various components of computing device 102 may all be in a stand-alone computing system according to some embodiments, while in others, may be distributed across multiple machines. For example, module 702 may be provided in a computing system distinct from computing device 802. In a more general sense, the degree of integration and distribution of the functional component(s) provided herein can vary greatly from one embodiment to the next, as will be appreciated in light of this disclosure.

Figure 9:
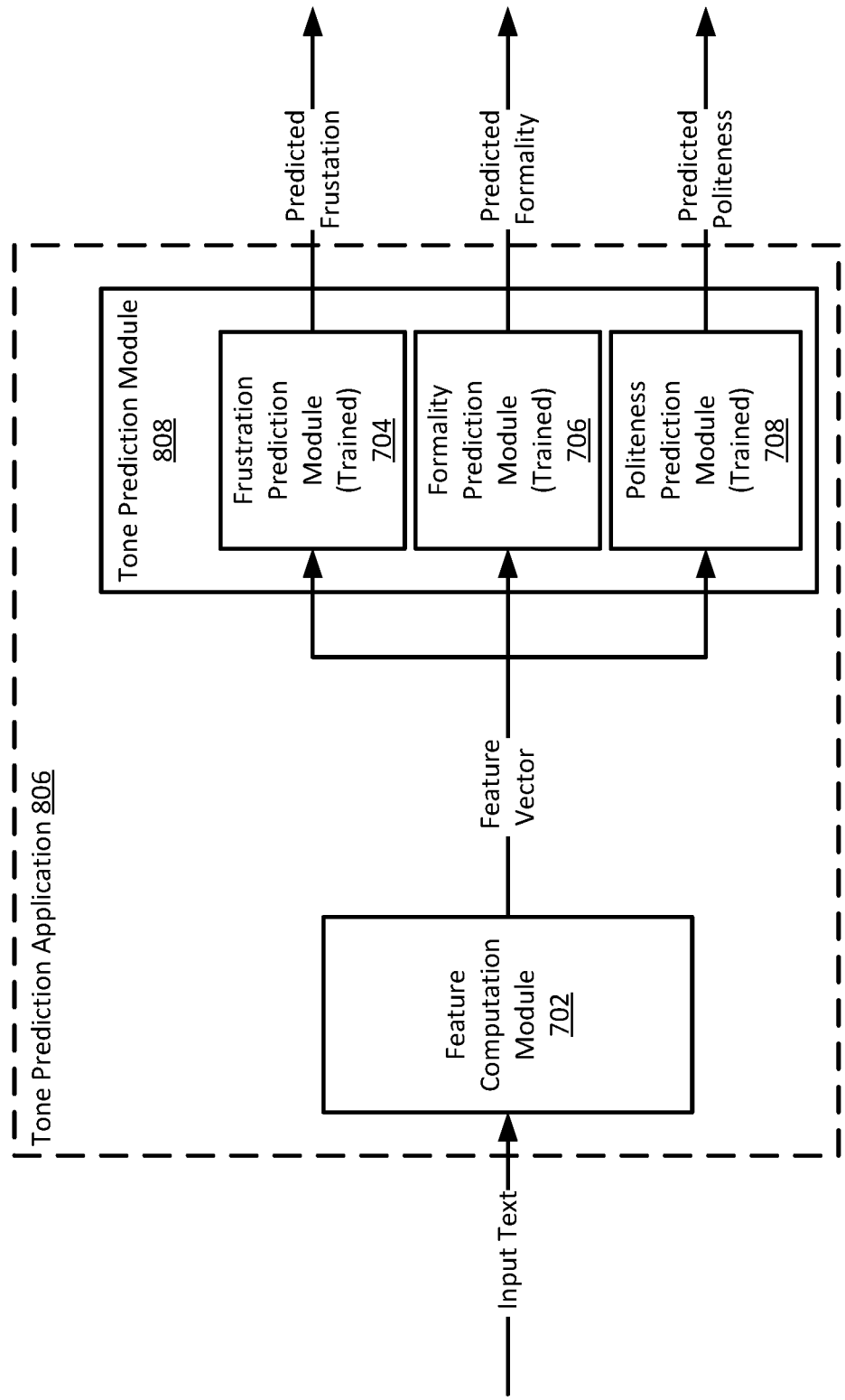
FIG. 9 is a block diagram illustrating an example tone prediction by a tone prediction application, in accordance with an embodiment of the present disclosure.

FIG. 9 is a block diagram illustrating an example tone prediction by tone prediction application 806 of FIG. 8, in accordance with an embodiment of the present disclosure. As shown in FIG. 9, tone prediction module 808 includes a trained frustration prediction module 704, a trained formality prediction module 706, and a trained politeness prediction module 708. As described previously, for a provided text communication, trained frustration prediction module 704 predicts a measure of frustration, trained formality prediction module 706 predicts a measure of formality, and trained politeness prediction module 708 predicts a measure of frustration.

In one example use case and embodiment, input text may be provided or otherwise made available to tone prediction application 806. A user may, for instance, have drafted a text communication, such as an email. Prior to sending the email to its intended recipient(s), the user may provide the email to tone prediction application 806 to determine the tone of the contents of the email. In response to being provided the text communication, tone prediction application 806 may extract the contents of the text communication, and provide the extracted contents to feature computation model 702 as input text. Feature computation module 702 can then extract features from the provided contents, and generate a feature vector for the text communication using the extracted features. The generated feature vector represents the text communication and, more specifically, the contents of the text communication. Feature computation module 702 may provide or otherwise make available the generated feature vector to tone prediction module 808 for determination of a tone of the contents of the text communication. Tone prediction module 808 may then predict the tone of the contents of the text communication utilizing trained frustration prediction module 704, trained formality prediction module 706, and trained politeness prediction module 708 included in tone prediction module 808. Specifically, trained frustration prediction module 704 may predict a measure of frustration of the text communication based on the feature vector generated by feature computation module 702. Similarly, trained formality prediction module 706 may predict a measure of formality of the text communication based on the feature vector generated by feature computation module 702, and trained politeness prediction module 708 may predict a measure of politeness of the text communication based on the feature vector generated by feature computation module 702.

As will be appreciated, tone prediction module 808 may, in some cases, not provide measures of frustration, formality, and politeness of an input text communication. In some cases, tone prediction module 808 may not include all three trained modules 704, 706, and 708. Tone prediction module 808 may, for instance, include trained frustration prediction module 704 and trained formality prediction module 706, but not trained politeness prediction module 708. In this case, tone prediction module 808 may provide measures of frustration and formality, and not politeness, of an input text communication. In a general sense, tone prediction module 808 may include any combination of trained modules 704, 706, and 708.

Figure 10:
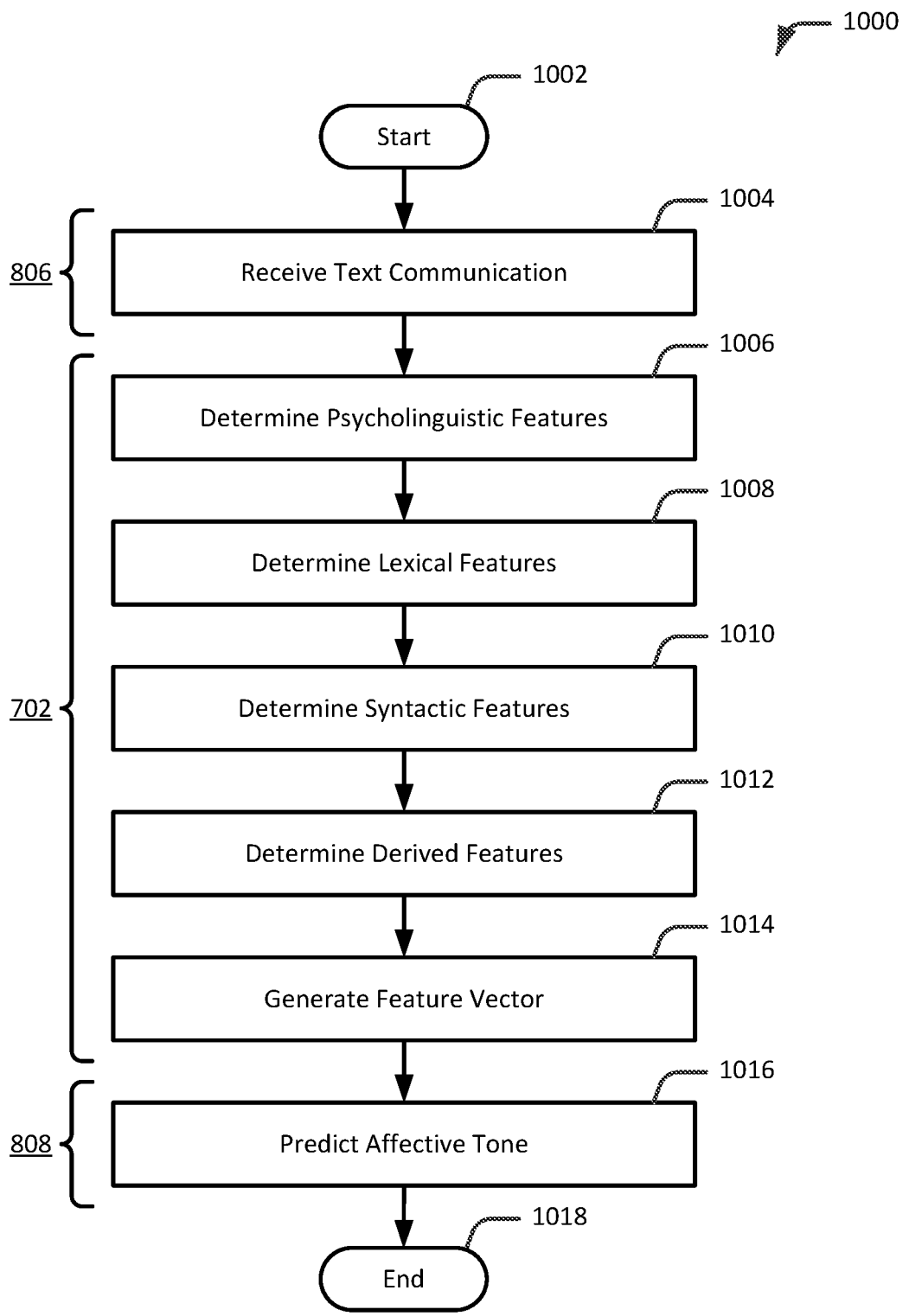
FIG. 10 is a flow diagram illustrating an example process for predicting tone of a text communication, in accordance with an embodiment of the present disclosure.

FIG. 10 is a flow diagram illustrating an example process 1000 for predicting tone of a text communication, in accordance with an embodiment of the present disclosure. The operations, functions, or actions illustrated in example process 1000 may in some embodiments be performed by tone prediction system 800 and, more particularly, tone prediction application 806 of computing device 802 of FIG. 8. The operations, functions, or actions described in the respective blocks of example process 1000 may also be stored as computer-executable instructions in a non-transitory computer-readable medium, such as memory 1104 and/or data storage 1106 of a computing system 1100. In some instances, process 900 may be performed by components of computing device 802.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 10, process 1000 is initiated at block 1002. By way of an example use case, a user may have drafted a text communication to introduce a new product. Prior to distributing the drafted text communication to potential customers, the user may provide the drafted text communication to tone prediction application 806 to determine the tone of the contents of the text communication.

At block 1004, tone prediction application 806 receives or is otherwise provided the draft text communication. At block 1006, tone prediction application 806 determines the psycholinguistic features of the draft text communication. For instance, feature computation module 702 of tone prediction application 806 may extract the psycholinguistic features from the contents of the draft text communication. At block 1008, tone prediction application 806 determines the lexical features of the draft text communication. For instance, feature computation module 702 of tone prediction application 806 may extract the lexical features from the contents of the draft text communication.

At block 1010, tone prediction application 806 determines the syntactic features of the draft text communication. For instance, feature computation module 702 of tone prediction application 806 may extract the syntactic features from the contents of the draft text communication. At block 1012, tone prediction application 806 determines the derived features of the draft text communication. For instance, feature computation module 702 of tone prediction application 806 may extract the derived features from the contents of the draft text communication.

At block 1014, tone prediction application 806 generates a feature vector for the draft text communication using the determined psycholinguistic features, lexical features, syntactic features, and derived features. For instance, feature computation module 702 of tone prediction application 806 may generate the feature vector by concatenating the extracted psycholinguistic features, lexical features, syntactic features, and derived features.

At block 1016, tone prediction application 806 predicts an affective tone of the draft text communication based on the generated feature vector. In some embodiments, the affective tone may include any combination of measures of frustration, formality, and politeness of the draft text communication. For instance, tone prediction module 808 of tone prediction application 806 may generate one or more of the predicted measures of frustration, formality, and politeness of the draft text communication.

In some embodiments, additional or alternative operations may be performed. For example, in one embodiment, tone prediction application 806 may also determine the formality features of the draft text communication. The determined formality features can then be used in generating the feature vector for the draft text communication. In another embodiment, tone prediction application 806 may generate a feature vector for the draft text communication using a portion (e.g., subset) of the determined psycholinguistic features, lexical features, syntactic features, and derived features.

Figure 11:
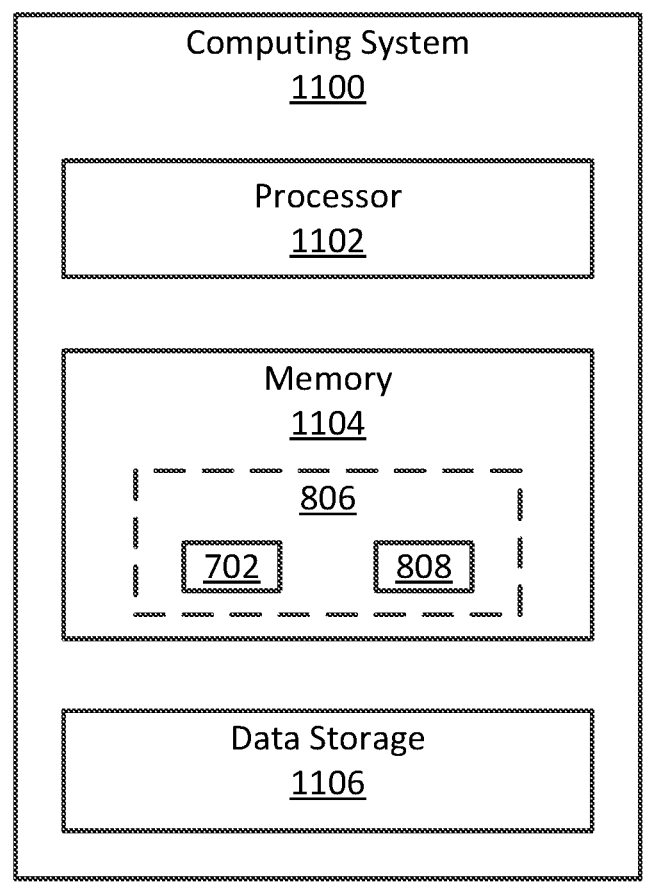
FIG. 11 is a block diagram illustrating selected components of an example computing system that may be used to perform any of the techniques as variously described in the present disclosure, according to an embodiment.

FIG. 11 is a block diagram illustrating selected components of an example computing system 1100 that may be used to perform any of the techniques as variously described in the present disclosure, according to an embodiment. In some embodiments, computing system 1100 may be configured to implement or direct one or more operations associated with some or all of the engines, components and/or modules associated with tone prediction system 800 of FIG. 8. For example, tone prediction application 806, including feature computation module 702 and a trained tone prediction module 808, or any combination of these may be implemented in and/or using computing system 1100. In one example case, for instance, each of tone prediction application 806, feature computation module 702, and a trained tone prediction module 808 is loaded in memory 1104 and executable by a processor 1102. Computing system 1100 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 1100 may include processor 1102, memory 1104, and data storage 1106. Processor 1102, memory 1104, and data storage 1106 may be communicatively coupled.

In general, processor 1102 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 1102 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 11, processor 1102 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 1102 may be configured to interpret and/or execute program instructions and/or process data stored in memory 1104, data storage 1106, or memory 1104 and data storage 1106. In some embodiments, processor 1102 may fetch program instructions from data storage 1106 and load the program instructions in memory 1104. After the program instructions are loaded into memory 1104, processor 1102 may execute the program instructions.

For example, in some embodiments, any one or more of the engines, components and/or modules of tone prediction system 800 may be included in data storage 1106 as program instructions. Processor 1102 may fetch some or all of the program instructions from data storage 1106 and may load the fetched program instructions in memory 1104. Subsequent to loading the program instructions into memory 1104, processor 1102 may execute the program instructions such that the computing system may implement the operations as directed by the instructions.

In some embodiments, virtualization may be employed in computing device 1100 so that infrastructure and resources in computing device 1100 may be shared dynamically. For example, a virtual machine may be provided to handle a process running on multiple processors so that the process appears to be using only one computing resource rather than multiple computing resources. Multiple virtual machines may also be used with one processor.

Memory 1104 and data storage 1106 may include computer-readable storage media for carrying or having computer-executable instructions or data structures stored thereon. Such computer-readable storage media may include any available media that may be accessed by a general-purpose or special-purpose computer, such as processor 1102. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1102 to perform a certain operation or group of operations.

Modifications, additions, or omissions may be made to computing system 1100 without departing from the scope of the present disclosure. For example, in some embodiments, computing system 1100 may include any number of other components that may not be explicitly illustrated or described herein.

As indicated above, the embodiments described in the present disclosure may include the use of a special purpose or a general purpose computer (e.g., processor 1102 of FIG. 11) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 1104 of FIG. 11) for carrying or having computer-executable instructions or data structures stored thereon.

Numerous example variations and configurations will be apparent in light of this disclosure. According to some examples, computer-implemented methods to predict tone of a text communication are described. An example computer-implemented method may include: receiving, by a tone prediction application, a text communication for which to predict a tone; generating, by a feature computation module, a feature vector for the text communication using multiple features extracted from the text communication, wherein the multiple features include psycholinguistic features; and predicting, by a tone prediction module that includes at least one trained prediction module, a tone of the text communication based on the feature vector, wherein the at least one trained prediction module is trained using psycholinguistic features extracted from each text communication in a training set used to train the at least one trained prediction module.

In some examples, the psycholinguistic features used in generating the feature vector include at least one of valence, arousal, and dominance features. In other examples, the at least one of valence, arousal, and dominance are extracted using Warriner's lexicon. In still other examples, the psycholinguistic features used in generating the feature vector include Emolex features. In yet other examples, the psycholinguistic features used in generating the feature vector include PERMA features. In further examples, the multiple features used in generating the feature vector include at least one of lexical features, syntactic features, derived features, and formality features. In still further examples, the at least one trained prediction module is one of a trained frustration prediction module, a trained formality prediction module, and a trained politeness prediction module. In yet further examples, the at least one trained prediction module is a regressor. In other examples, the at least one trained prediction module is a classifier.

According to some examples, computer program products including one or more non-transitory machine readable mediums encoded with instructions that when executed by one or more processors cause a process to be carried out to predict tone of a text communication are described. An example process may include: generating, by a feature computation module, a feature vector for a text communication using multiple features extracted from the text communication, wherein the multiple features include psycholinguistic features; and predicting, by a tone prediction module that includes at least one trained prediction module, a tone of the text communication based on the feature vector, wherein the at least one trained prediction module is trained using psycholinguistic features extracted from each text communication in a training set used to train the at least one trained prediction module.

In some examples, the psycholinguistic features used in generating the feature vector include at least one of valence, arousal, and dominance features, Emolex features, and PERMA features. In other examples, the multiple features used in generating the feature vector include at least one of lexical features, syntactic features, derived features, and formality features. In still other examples, the at least one trained prediction module is one of a trained frustration prediction module, a trained formality prediction module, and a trained politeness prediction module. In yet other examples, the at least one trained prediction module is a first trained prediction module to predict a measure of a first tone dimension, and wherein the tone prediction module includes a second trained prediction module to predict a measure of a second tone dimension. In further examples, the tone of the text communication includes at least one of a frustration, formality, and politeness.

According to some examples, systems to predict tone of a text communication are described. An example system may include: one or more processors; a feature computation module at least one of controllable and executable by the one or more processors, and configured to generate a feature vector for a text communication using multiple features extracted from the text communication, wherein the multiple features include psycholinguistic features; and a tone prediction module at least one of controllable and executable by the one or more processors, and configured to predict a tone of the text communication based on the feature vector, wherein the tone prediction module includes at least one trained prediction module trained using psycholinguistic features extracted from each text communication in a training set used to train the at least one trained prediction module.

In some examples, the psycholinguistic features used in generating the feature vector include at least one of valence, arousal, and dominance features, Emolex features, and PERMA features. In other examples, the multiple features used in generating the feature vector include at least one of lexical features, syntactic features, derived features, and formality features. In still other examples, the at least one trained prediction module is one of a trained frustration prediction module, a trained formality prediction module, and a trained politeness prediction module. In yet other examples, the tone of the text communication includes at least one of a frustration, formality, and politeness.

According to some examples, methods to generate training samples for training a tone prediction module to predict tone of a text communication are described. An example method may include: receiving a corpus of text communications including multiple text communications; labeling each text communication of the multiple text communications with a label; generating a feature vector for each text communication of the multiple text communications, the feature vector including multiple features extracted from the text communication, wherein the multiple features includes psycholinguistic features; and generating a set of training samples from the multiple text communications, each training sample in the set of training samples including a feature vector and a label of a text communication; wherein the set of training samples being suitable to train the tone prediction module.

In some examples, the psycholinguistic features include at least one of valence, arousal, and dominance features, Emolex features, and PERMA features. In other examples, the multiple features used in generating the feature vector include at least one of lexical features, syntactic features, derived features, and formality features. In still other examples, labeling each text communication of the multiple text communications is by crowdsourcing. In yet other examples, the label indicates a degree of one of frustration, formality, and politeness.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to predict tone of a text communication, the method comprising:
   receiving, by a tone prediction algorithm, a text communication for which to predict a tone, the text communication comprising a plurality of words;
   identifying an analyzed subset of the plurality of words, wherein each word in the analyzed subset is included in a designated lexicon;
   for each word in the analyzed subset, extracting from the designated lexicon, a quantity of psycholinguistic values, each of which is associated with a corresponding psycholinguistic feature;

for each psycholinguistic feature, calculating an aggregate psycholinguistic value corresponding to a sum of the psycholinguistic values associated with the psycholinguistic feature;

generating, by a feature computation module, a feature vector for the text communication,
   wherein the feature vector has a number of dimensions that is greater than or equal to the quantity of psycholinguistic values extracted from the designated lexicon for each word in the analyzed subset,
   wherein each of at least some of the dimensions of the feature vector correspond to one of the corresponding psycholinguistic features, and
   wherein the feature vector comprises the aggregate psycholinguistic values for each of the psycholinguistic features;

predicting, by a first trained prediction module, a numerical score for a first tone dimension of the text communication based on the feature vector, wherein the first trained prediction module is trained to quantify the first tone dimension using the psycholinguistic features as extracted from text communications in a training set; and predicting, by a second trained prediction module, a numerical score for a second tone dimension of the text communication based on the feature vector, wherein the second trained prediction module is trained to quantify the second tone dimension using the psycholinguistic features as extracted from text communications in the training set, wherein the numerical scores for the first and second tone dimensions characterize the tone of the text communication.

2. The method of claim 1, wherein
the quantity psycholinguistic values is at least three, and
the psycholinguistic features corresponding to the at least three psycholinguistic values include valence, arousal, and dominance.

3. The method of claim 1, wherein the designated lexicon is Warriner's lexicon.

4. The method of claim 1, wherein
the quantity psycholinguistic values is at least eight, and
the psycholinguistic features corresponding to the at least eight psycholinguistic values include joy, fear, anger, sadness, anticipation, trust, disgust, and surprise.

5. The method of claim 1, wherein
the quantity psycholinguistic values is at least five, and
the psycholinguistic features corresponding to the at least five psycholinguistic values include positivity, engagement, relationship, meaning, and accomplishment.

6. The method of claim 1, wherein at least one of lexical features, syntactic features, derived features, and formality features are also used in generating the feature vector.

7. The method of claim 1, wherein the first and second tone dimensions are different dimensions selected from a group consisting of frustration, formality, and politeness.

8. The method of claim 1, wherein at least one of the trained prediction modules is a regressor.

9. The method of claim 1, wherein at least one of the trained prediction modules is a classifier.

10. A computer program product including one or more non-transitory machine readable mediums encoded with instruction that when executed by one or more processors cause a process to be carried out to predict tone of a text communication, the process comprising:

receiving a text communication for which to predict a tone, the text communication comprising a plurality of words;

identifying an analyzed subset of the plurality of words, wherein each word in the analyzed subset is included in a designated lexicon;

for each word in the analyzed subset, extracting from the designated lexicon, a quantity of psycholinguistic values, each of which is associated with a corresponding psycholinguistic feature;

for each psycholinguistic feature, calculating an aggregate psycholinguistic value corresponding to a sum of the psycholinguistic values associated with the psycholinguistic feature;

generating, by a feature computation module, a feature vector for the text communication,
   wherein the feature vector has a number of dimensions that is greater than or equal to the quantity of psycholinguistic values extracted from the designated lexicon for each word in the analyzed subset,
   wherein each of at least some of the dimensions of the feature vector correspond to one of the corresponding psycholinguistic features, and
   wherein the feature vector comprises the aggregate psycholinguistic values for each of the psycholinguistic features; and predicting, by a first trained prediction module, a numerical score for a first tone dimension of the text communication based on the feature vector, wherein the first trained prediction module is trained to quantify the first tone dimension using the psycholinguistic features as extracted from text communications in a training set, wherein the numerical score for the first tone dimension characterizes the tone of the text communication.

11. The computer program product of claim 10, wherein
the quantity psycholinguistic values is at least two, and
the psycholinguistic features corresponding to the at least two psycholinguistic values include at least one of valence, arousal, dominance, joy, fear, anger, sadness, anticipation, trust, disgust, surprise, positivity, engagement, relationship, meaning, and accomplishment.

12. The computer program product of claim 10, wherein at least one of lexical features, syntactic features, derived features, and formality features are also used in generating the feature vector.

13. The computer program product of claim 10, wherein the first tone dimension is selected from a group consisting of frustration, formality, and politeness.

14. The computer program product of claim 10, wherein the first trained prediction module is a regressor.

15. The computer program product of claim 10,
wherein the process further comprises predicting, by a second trained prediction module, a numerical score for a second tone dimension of the text communication based on the feature vector,
wherein the second trained prediction module is trained to quantify the second tone dimension using the psycholinguistic features as extracted from text communications in the training set,
wherein the first and second tone dimensions characterize the tone of the text communication, and
wherein the first and second tone dimensions are different tone dimensions selected from a group consisting of frustration, formality, and politeness.

16. A computer-implemented method to generate training samples for training a tone prediction module to predict tone of a text communication, the method comprising:

receiving a text communication comprising a plurality of words;

assigning a plurality of labels to the text communication, each of the labels representing a degree of a tone dimension reflected in the text communication;

identifying an analyzed subset of the plurality of words, wherein each word in the analyzed subset is included in a designated lexicon;

for each word in the analyzed subset, extracting from the designated lexicon, a quantity of psycholinguistic values, each of which is associated with a corresponding psycholinguistic feature;

for each psycholinguistic feature, calculating an aggregate psycholinguistic value corresponding to a sum of the psycholinguistic values associated with the psycholinguistic feature;

generating a feature vector for the text communication,
    wherein the feature vector has a number of dimensions that is greater than or equal to the quantity of psycholinguistic values extracted from the designated lexicon for each word in the analyzed subset,
    wherein each of at least some of the dimensions of the feature vector correspond to one of the corresponding a set of psycholinguistic features, and
    wherein the feature vector comprises the aggregate psycholinguistic values for each of the psycholinguistic features; and generating a training sample from the text communication, the training sample including the feature vector and one of the plurality of labels;

wherein the plurality of labels characterize a tone of the received text communication.

17. The method of claim 16, wherein
    the quantity psycholinguistic values is at least two, and
    the psycholinguistic features corresponding to the at least two psycholinguistic values include at least one of valence, arousal, dominance, joy, fear, anger, sadness, anticipation, trust, disgust, surprise, positivity, engagement, relationship, meaning, and accomplishment.

18. The method of claim 16, wherein at least one of lexical features, syntactic features, derived features, and formality features are also used in generating the feature vector.

19. The method of claim 16, wherein each of the plurality of labels is acquired by crowdsourcing.

20. The method of claim 16, wherein a first one of the labels indicates a degree of frustration, a second one of the labels indicates a degree of formality, and a third one of the labels indicates a degree of politeness.

* * * * *